United States Patent

McLafferty

[15] 3,665,336
[45] May 23, 1972

[54] LASER DEVICE

[72] Inventor: George H. McLafferty, Manchester, Conn.

[73] Assignee: United Aircraft Corporation, East Hartford, Conn.

[22] Filed: May 23, 1968

[21] Appl. No.: 731,659

[52] U.S. Cl............................................................331/94.5
[51] Int. Cl.............................................H01s 3/05, H01s 3/09
[58] Field of Search................................331/94.5; 330/4.3

[56] References Cited

OTHER PUBLICATIONS

Leonard, " Design and Use of an U. V. Laser," 2/67, pg. 26–32, Laser Focus
Wilson, " Nitrogen Laser Action in a Supersonic Flow," 4/1/66, pg. 159–161, Applied Phy. Let., vol 8, 07

Primary Examiner—Benjamin A. Borchelt
Assistant Examiner—N. Moskowitz
Attorney—Jack N. McCarthy

[57] ABSTRACT

A multistage laser device has in combination a plurality of gas dynamic lasers to obtain a high level of laser power output. A combustor having an exhaust duct with the proper gas constituents is directed into a supersonic nozzle and expanded thereby. During the expansion process a population inversion occurs in the gas constituents which provides a laser action which occurs in a laser region downstream of the expansion nozzle. The gases are then diffused in a variable geometry diffuser and directed into the second supersonic nozzle and re-expanded thereby. A second laser region is formed and the gases are then diffused in a second variable geometry diffuser. This diffuser directs this flow into a third supersonic nozzle and expands it again. A third laser region is formed and the gases are diffused again in a third variable geometry diffuser and directed into the atmosphere or to a turbine for obtaining shaft power necessary for pumps or compressors. The gas dynamic lasers are positioned so that an oscillator can direct a beam into the lasing region of one gas laser through an opening and have it amplified by action therein between two reflecting surfaces and then directed to the exterior of the region through an opening and passed through an interconnecting optical cavity where it is redirected to the lasing region of a second gas laser. The beam is re-amplified by the two reflective surfaces in this region and directed to a second interconnecting optical cavity where the beam is then redirected into the third lasing region of another gas laser. The beam is re-amplified by the reflective surfaces in this third region and directed as a laser output beam through an aerodynamic window. While the gas lasers shown are of the expansion type, it is probably desirable to employ a supersonic-mixing gas dynamic laser configuration for the first unit downstream of the combustor. This is because the supersonic-mixing laser avoids many of the losses associated with rapid kinetic rates at high pressures.

6 Claims, 3 Drawing Figures

Patented May 23, 1972  3,665,336

A — SUPERSONIC NOZZLE
B — LASING REGION
C — DIFFUSER

INVENTOR
GEORGE H. McLAFFERTY
BY Jack N. M. Carthy
AGENT 3,665,336

LASER DEVICE

BACKGROUND OF THE INVENTION

This invention relates to gas dynamic lasers and particularly to their use in a combination arrangement to extract maximum energy from a system.

SUMMARY OF THE INVENTION

A primary object of the present invention is to combine a plurality of gas dynamic lasers so that the maximum energy can be obtained.

In accordance with the present invention, expansion and supersonic mixing gas lasers are combined to provide a device from which to extract laser power at a high level.

In accordance with a further aspect of the present invention, a plurality of gas dynamic lasers are placed in a parallel arrangement to each other physically, while the gas flow is through them in a series path, so that the lasers can be optically interconnected to provide for a laser beam from an oscillator through to an aerodynamic window.

This invention includes variable geometry diffusers to minimize the required overall pressure ratio throughout the system.

This invention includes an optical cavity between adjacent lasing regions.

DESCRIPTION OF THE PREFERRED EMBODIMENT

Figure 1:
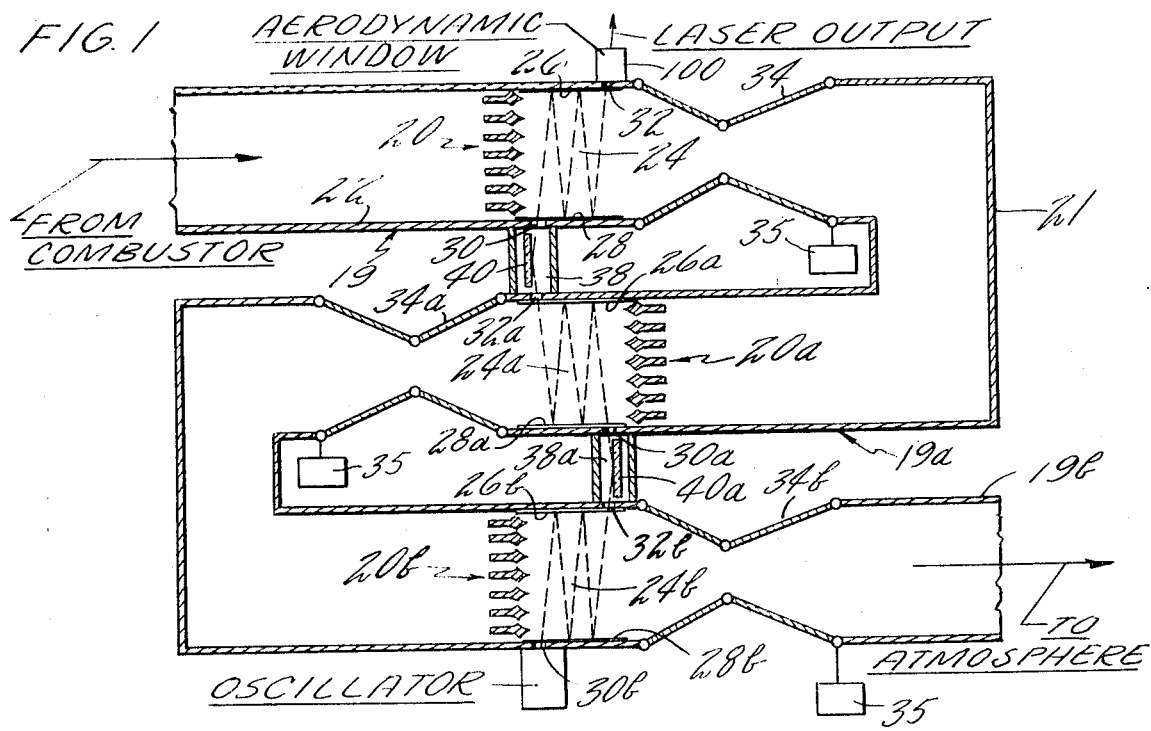
FIG. 1 is the schematic view showing three expansion gas dynamic lasers in gas flow series setting forth the multiple lasing regions.

In FIG. 1 flow enters the nozzle 2 from a combustor through an exhaust duct 1, said flow having a combination of gases with the proper gas constituents for lasing action. The flow expanding through the first nozzle would provide lasing action in the first lasing region 3 and would be slowed down to subsonic velocities by a convergent passage and a normal shock in a diffuser 4. This flow would then be re-accelerated through a second nozzle 6 and a flow path through this second nozzle would provide a second lasing action in the region 7 immediately downstream of the nozzle 6. The flow from this region would then be slowed down to subsonic velocities by a diffuser 8 in a manner similar to the diffuser 4. This process is repeated through the nozzle 10 with the lasing action occurring in region 11 downstream of the nozzle with a diffuser 12 being provided. If optical means were to be provided to pass a beam through the three laser regions set forth in FIG. 1, it can be seen that it would be more complicated than that shown in FIG. 2.

Figure 3:
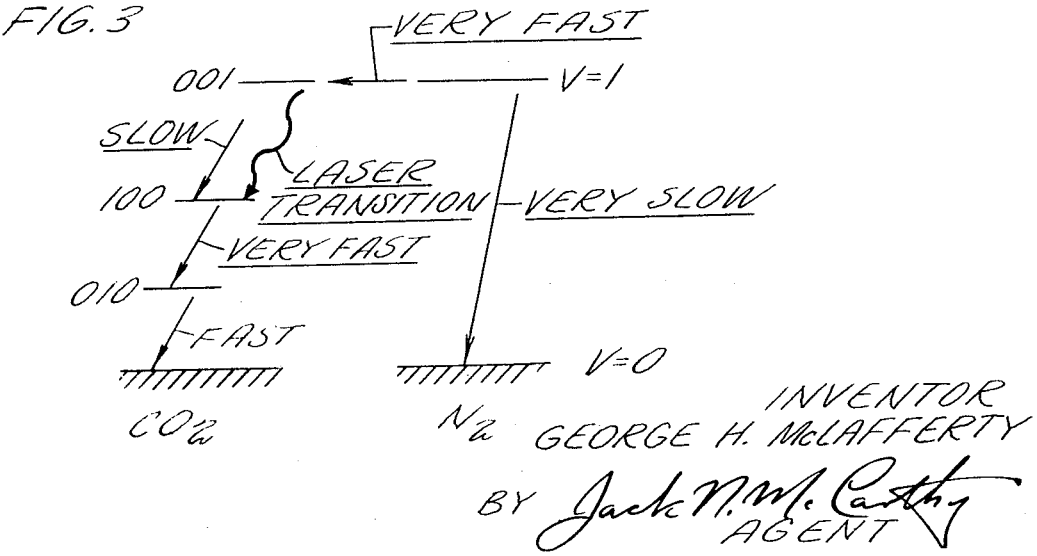
FIG. 3 is an energy level diagram for carbon dioxide and nitrogen.

Gas constituents which were actually tested were carbon dioxide, nitrogen, and a diluent gas such as water vapor. Simplified energy level diagrams for carbon dioxide and nitrogen are shown in FIG. 3. Laser action occurs due to transitions between the 001 and 100 states in carbon dioxide. The energy for the upper state is obtained primarily by collisions with nitrogen molecules, which transfer energy from the $v = 1$ state in nitrogen to the 001 state in $CO_2$. Energy is removed from the lower lasing level, the 100 level in $CO_2$, to the ground state via the 010 level. The purpose of the addition of water vapor or helium is to cause rapid draining of the lower energy levels in $CO_2$, without causing high relaxation rates for the upper level. As noted on FIG. 3, the rate of energy exchange between the $v = 1$ level in nitrogen and the 001 level in $CO_2$, is very fast; the relaxation of the lower level in $CO_2$ is fast, while the direct de-excitation of the 001 level of $CO_2$ by collisions is slow.

Since expansion and supersonic-mixing gas dynamic lasers have been mentioned they will be discussed here. The expansion laser and the supersonoc-mixing laser receive energy from a combustion process upstream of the nozzle throat. In an expansion laser, constituents are mixed upstream of the throat. The populations in the 001 state in $CO_2$ and the $v = 1$ state in nitrogen are effectively frozen during the expansion process at the relatively high values associated with the high stagnation temperature because of the slow relaxation rates for these states. The populations in the 100 and 010 states in $CO_2$ decrease during the expansion process because of the decrease in static temperature and the fast relaxation rates for these states. The difference in relaxation rates leads to a population inversion in the 001 and 100 states and, hence, laser action.

The supersonic-mixing laser is based on the injection of one or more constituents into the supersonic flow downstream of the nozzle throat. One of these constituents could be the water vapor or helium which is employed to depopulate the lower energy levels of $CO_2$. It might also be desirable to inject $CO_2$ downstream of the nozzle throat. In this case, the nitrogen would be heated by partial combustion of some carbon-containing compound upstream of the nozzle throat. For instance, either carbon particles or cyanogen could be employed to obtain carbon monoxide gas upstream of the throat; the relaxation rates for the upper states in CO are much slower than for $CO_2$.

Figure 2:
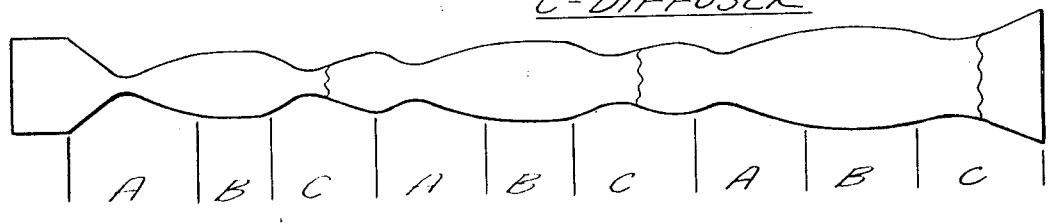
FIG. 2 is a schematic view showing an arrangement of three gas dynamic lasers which permit a path for a laser beam with a minimum of optic equipment.

In FIG. 2, flow enters nozzle 20 of a first gas dynamic laser 19, from a combustor through an exhaust duct 22. This flow is of a gas containing the proper gas constituents, referred to above, and in one program a composition of 85 percent nitrogen, 14 percent carbon dioxide and 1 percent water vapor was used. A nozzle of the type referred to above was filed May 10, 1968, by R. C. Mulready and is entitled "Wafer Nozzle" and a combustor of the type referred to above is being filed herewith by John Chamberlain and is entitled "Combustion Chamber Device". The flow expands through the nozzle 20 and provides a first lasing region 24. Two reflecting walls 26 and 28 are positioned in the lasing region to provide an amplification of a laser beam directed thereinto by either another gas laser or oscillator. An opening 30 is provided for a beam inlet and an opening 32 is provided for a beam outlet. The downstream end of the lasing region 24 is connected to the inlet of a variable geometry diffuser 34. The geometry of the diffuser can be actuated by any known actuating mechanism 35.

The outlet of the diffuser 34 is connected to the inlet of a second gas laser 19a by a duct 21. The gas laser 19a has a nozzle 20a, a lasing region 24a with reflecting walls 26a and 28a, openings 30a and 32a, and a variable geometry diffuser 34a. The laser 19a is placed adjacent laser 19 so that their lasing regions 24a and 24, respectively, are as close as possible with the opening 32a in line with the opening 30. An optical cavity 38 is formed between the lasers 19a and 19 enclosing the openings 30a and 32a. A mirror 40 is located in the cavity 38 to properly reflect a beam entering the cavity, as will be hereinafter described.

The outlet of the diffuser 34a is connected to the inlet of a third gas laser 19b by a duct 21a. The gas laser 19b has a nozzle 20b, a lasing region 24b with reflecting walls 26b and 28b, openings 30b and 32b, and a variable geometry diffuser 34b. The laser 19b is placed adjacent laser 19a so that their lasing regions 24b and 24a, respectively, are as close as possible with the opening 32b in line with the opening 32a. An optical cavity 38a is formed between the lasers 19b and 19a enclosing the openings 30a and 32b. A reflecting mirror 40a is located in the cavity 38a to properly reflect a beam entering the cavity, as will be hereinafter described.

An oscillator 50 is located so as to direct a laser beam into the hole 30b against the reflecting wall 26b, this beam is thus reflected back to reflecting wall 28b through the lasing region 24b, and several other passes are made amplifying the beam from the oscillator. The amplified beam is then directed through the opening 32b into the cavity 38a where it strikes the mirror 40a and is directed into the opening 30a and against the reflecting wall 26a. The beam is then reflected between walls 26a and 28a by an odd number of passes through the lasing region 24a and amplified again. The amplified beam is then directed through the opening 32a into the cavity 38 where it strikes the mirror 40 and is directed into the opening 30 and against the reflecting wall 26. The beam is then reflected between walls 26 and 28 by an odd number of passes through the lasing region 24 and amplified again. The amplified beam is then directed through the opening 32 into an aerodynamic window 100. The beam leaving the window 100 is the output beam of the laser device. An aerodynamic window of the type referred to above is being filed herewith by George McLafferty and is entitled "Aerodynamic Window".

It is not necessary to diffuse to subsonic velocities between stages to make the device work; it is only necessary to diffuse to a low enough Mach number to get a high enough temperature to re-populate the upper states between stages.

It is to be understood that the invention is not limited to the specific description above or specific figures shown, but may be used in other ways without departure from its spirit as defined by the following claims.

I claim:

1. A gas dynamic laser device having in combination a plurality of gas dynamic lasers, each laser having a short supersonic nozzle with an inlet, a lasing region downstream of each nozzle, reflecting walls in each lasing region arranged to form a laser cavity, a diffuser means downstream of each lasing region having an outlet, said lasers being arranged in series with the inlet of the short supersonic nozzle of the first gas laser connected to a device having an exhaust which contains gas constituents which will provide population inversion of excited states by sudden expansion in a supersonic nozzle, the outlet of said diffuser means of the first gas laser being connected to the inlet of the short supersonic nozzle of the second gas laser, optical means for passing a laser beam through the lasing regions in series to provide an output beam.

2. A combination as set forth in claim 1 wherein said gas lasers are arranged with the lasing regions adjacent each other.

3. A combination as set forth in claim 1 wherein said optical means includes an optical cavity between lasing regions of adjacent gas lasers.

4. A combination as set forth in claim 1 wherein said diffuser means is formed of variable geometry, and means for varying the geometry of said diffuser means.

5. A combination as set forth in claim 3 wherein said optical means includes an input oscillator for directing a laser beam into the laser cavity of one gas dynamic laser, said laser cavity being capable of amplifying an input beam, said optical means being capable of directing an amplified beam into said optical cavity between lasing regions of adjacent gas lasers for directing the beam into said second gas laser.

6. A combination as set forth in claim 5 wherein the output beam is passed through an aerodynamic window.

* * * * *